(12) United States Patent
De'Longhi et al.

(10) Patent No.: US 11,071,407 B2
(45) Date of Patent: Jul. 27, 2021

(54) MILK EMULSIFYING DEVICE WITH A VENTURI EFFECT AND A PRODUCTION METHOD OF HOT MILK WITH AND WITHOUT FROTH USING THE DEVICE

(71) Applicant: De'Longhi Appliances S.R.L., Treviso (IT)

(72) Inventors: Giuseppe De'Longhi, Treviso (IT); Paolo Evangelisti, Bologna (IT); Antonio Panciera, Carbonera (IT)

(73) Assignee: De'Longhi Appliances S.R.L., Treviso (IT)

( * ) Notice: Subject to any disclaimer, the term of this patent is extended or adjusted under 35 U.S.C. 154(b) by 153 days.

(21) Appl. No.: 16/337,128

(22) PCT Filed: Sep. 26, 2017

(86) PCT No.: PCT/EP2017/074367
§ 371 (c)(1),
(2) Date: Mar. 27, 2019

(87) PCT Pub. No.: WO2018/060191
PCT Pub. Date: Apr. 5, 2018

(65) Prior Publication Data
US 2020/0029728 A1  Jan. 30, 2020

(30) Foreign Application Priority Data

Sep. 27, 2016  (IT) .......................... 102016000096851

(51) Int. Cl.
*A47J 31/44* (2006.01)
*B01F 3/04* (2006.01)
*B01F 5/04* (2006.01)

(52) U.S. Cl.
CPC ....... *A47J 31/4485* (2013.01); *A47J 31/4489* (2013.01); *B01F 5/0405* (2013.01);
(Continued)

(58) Field of Classification Search
CPC .... A47J 31/46; A47J 31/4485; A47J 31/4489; B01F 5/0413; B01F 5/0405; B01F 5/0406
See application file for complete search history.

(56) References Cited

U.S. PATENT DOCUMENTS

| 5,884,552 A | * | 3/1999 | Lussi | .................. A47J 31/4485 |
|---|---|---|---|---|
| | | | | 261/DIG. 7 |
| 2011/0100230 A1 | * | 5/2011 | Cheng | ................. A47J 31/4485 |
| | | | | 99/293 |

FOREIGN PATENT DOCUMENTS

EP   0803219 A1   10/1997
EP   1256299 A2   11/2001
(Continued)

OTHER PUBLICATIONS

International Search Report dated Dec. 12, 2017; International Application No. PCT/EP2017/074367; International Filing Date: Sep. 26, 2017; 4 pages.

(Continued)

*Primary Examiner* — Robert A Hopkins
(74) *Attorney, Agent, or Firm* — Blank Rome LLP

(57) ABSTRACT

The production method of hot milk with or without froth, with a Venturi effect emulsifying device suitable for sending, into a mixing chamber, a flow of steam so as to aspirate, by Venturi effect, milk and air or only milk, comprises a production cycle of hot milk with froth and a production cycle of hot milk without froth being carried out by supplying an equal flow of steam of equal duration into a mixing chamber having equal volume, equal conformation and equal inlet section of the milk but a different outflow section of the milk.

19 Claims, 11 Drawing Sheets

(52) U.S. Cl.
CPC .......... *B01F 5/0406* (2013.01); *B01F 5/0413* (2013.01); *B01F 2005/0431* (2013.01)

(56) References Cited

FOREIGN PATENT DOCUMENTS

| | | |
|---|---|---|
| EP | 2236061 A1 | 10/2010 |
| EP | 2987434 A1 | 2/2016 |
| WO | 2015078858 A1 | 6/2015 |

OTHER PUBLICATIONS

Written Opinion dated Dec. 12, 2017; International Application No. PCT/EP2017/074367; International Filing Date: Sep. 26, 2017; 5 pages.

\* cited by examiner

Fig_8

MILK EMULSIFYING DEVICE WITH A VENTURI EFFECT AND A PRODUCTION METHOD OF HOT MILK WITH AND WITHOUT FROTH USING THE DEVICE

RELATED APPLICATIONS

This application is a U.S. national phase application of International Application No. PCT/EP2017/074367, filed Sep. 26, 2017; which application claims benefit of priority of Italy Application No. 102016000096851, filed Sep. 27, 2016. Each of the above-identified related applications are incorporated by reference.

FIELD OF USE

The present invention refers to a milk emulsifying device and to a coffee machine incorporating the milk emulsifying device.

BACKGROUND OF THE INVENTION

Milk emulsifying devices are known which connect to a source of water steam provided by the coffee machine.

The emulsifying device generally has a mixing chamber operating by Venturi effect, connected to a steam inflow channel, to a milk aspirating channel by Venturi effect, to an air aspirating channel by Venturi effect provided with a check valve and to an external milk outflow channel in turn connected to an external dispensing channel of the milk.

The emulsifying device is able to prepare hot milk with or without froth.

To produce hot milk without froth the check valve is closed so as to prevent aspiration of air into the mixing chamber.

To produce hot milk with froth the check valve is instead opened.

In this emulsifying device in general the dispensing cycle of hot milk with froth and the production cycle of hot milk without froth are equally long and are carried out using a same flow of steam.

One of the drawbacks with an emulsifying device of this type consists in the fact that the hot milk without froth obtained in a cup has a lower temperature with respect to the hot milk with froth.

In practice the emulsifying device in general is not able to produce hot milk without froth with a temperature above 60-70° C.

This is explained by the fact that when the steam flow is supplied, a depression is created in the mixing chamber that is useful for aspirating the milk and possibly the air by Venturi effect. The depression created in the mixing chamber determines an aspiration of a flow of milk that increases as the flow of aspirated air diminishes that it in turn depends on the status of the check valve. The greater the flow of aspirated milk mixing with the flow of steam is, the lower the final temperature of the milk in the cup will be.

SUMMARY OF THE INVENTION

The technical task of the present invention is, therefore, to provide a milk emulsifying device which enables obviating the above-described technical drawbacks of the prior art.

In the ambit of this technical task an aim of the invention is to provide a milk emulsifying device which is able to dispense hot milk without froth having a substantially equal temperature to that of hot milk with froth without modifying the time for carrying out the dispensing cycle or the entity of the flow of steam used.

A further aim of the invention is to provide a milk emulsifying device which is able to dispense hot milk without froth having a substantially equal temperature to that of hot milk with froth without the use of other means for heating apart from the steam.

A further and not final aim of the invention is to provide a milk emulsifying device which enables production of various milk-based drinks having an optimal temperature.

The technical task, as well as these and other objects, according to the present invention are achieved by creating a milk emulsifying device comprising a hollow body having:
- a single mixing chamber operating by Venturi effect, connected to a single steam inflow channel, to a single milk aspirating channel by Venturi effect, to a single air aspirating channel by Venturi effect provided with a check valve and to a single milk outflow channel; or
- a first mixing chamber operating by Venturi effect and respectively at least a second mixing chamber by Venturi effect connected to a first steam inflow channel and respectively to at least a second steam inflow channel, to a first milk outflow channel and respectively to at least a second milk outflow channel, and to a first milk aspirating channel by Venturi effect and respectively to at least a second milk aspirating channel by Venturi effect, one between said first and second mixing chamber by Venturi effect being further connected to a respective air aspirating channel by Venturi effect;
- a single external milk dispensing channel connected to said single outflow channel or to said at least a second outflow channel;

said emulsifying device having a first dispensing operating configuration of hot milk with froth and a second operating dispensing configuration of hot milk without froth which differ in the size of the milk outflow section, and reconfigurating means activatable for switching between the first and the second configuration.

In a production cycle of hot milk without froth in which a flow of air is not aspirated, the outflow section having a greater size is advantageously operative, while in a production cycle of hot milk with froth in which a flow of air is aspirated the smaller size outflow section is operative.

In practice, all the other contingent conditions being equal, the effect on the entity of aspirated milk due to the greater outflow section operative in the production cycle of hot milk without froth compensates for the effect on the entity of aspirated milk due to the flow of aspirated air in the production cycle of milk with froth so that in both the production cycle of hot milk with froth and in the production cycle of hot milk without froth substantially the same flow of milk is aspirated, and the temperature of the hot milk with or without froth that is dispensed into the cup is substantially the same.

BRIEF DESCRIPTION OF THE DRAWINGS

Further characteristics and advantages of the invention will more fully emerge from the description of a preferred but not exclusive embodiment of the milk emulsifying device according to the invention, illustrated by way of non-limiting example in the accompanying figures of the drawings, in which.

DETAILED DESCRIPTION OF THE ILLUSTRATED EMBODIMENTS

Figure 1:
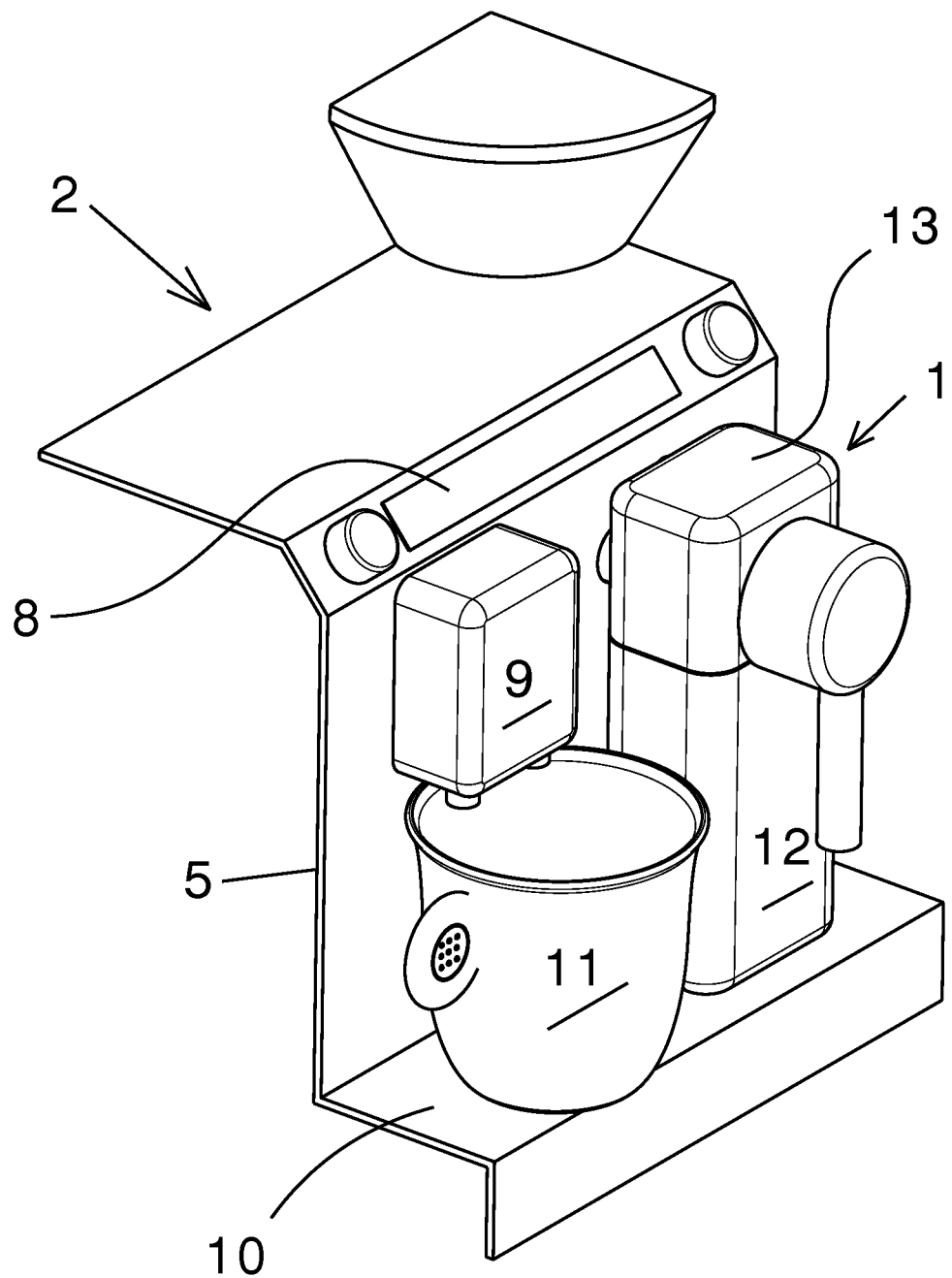
FIG. 1 is a perspective view from outside of the front part of a coffee machine to which the emulsifying device is associated, in which the external dispensing channel is in the rest position.
Figure 2:
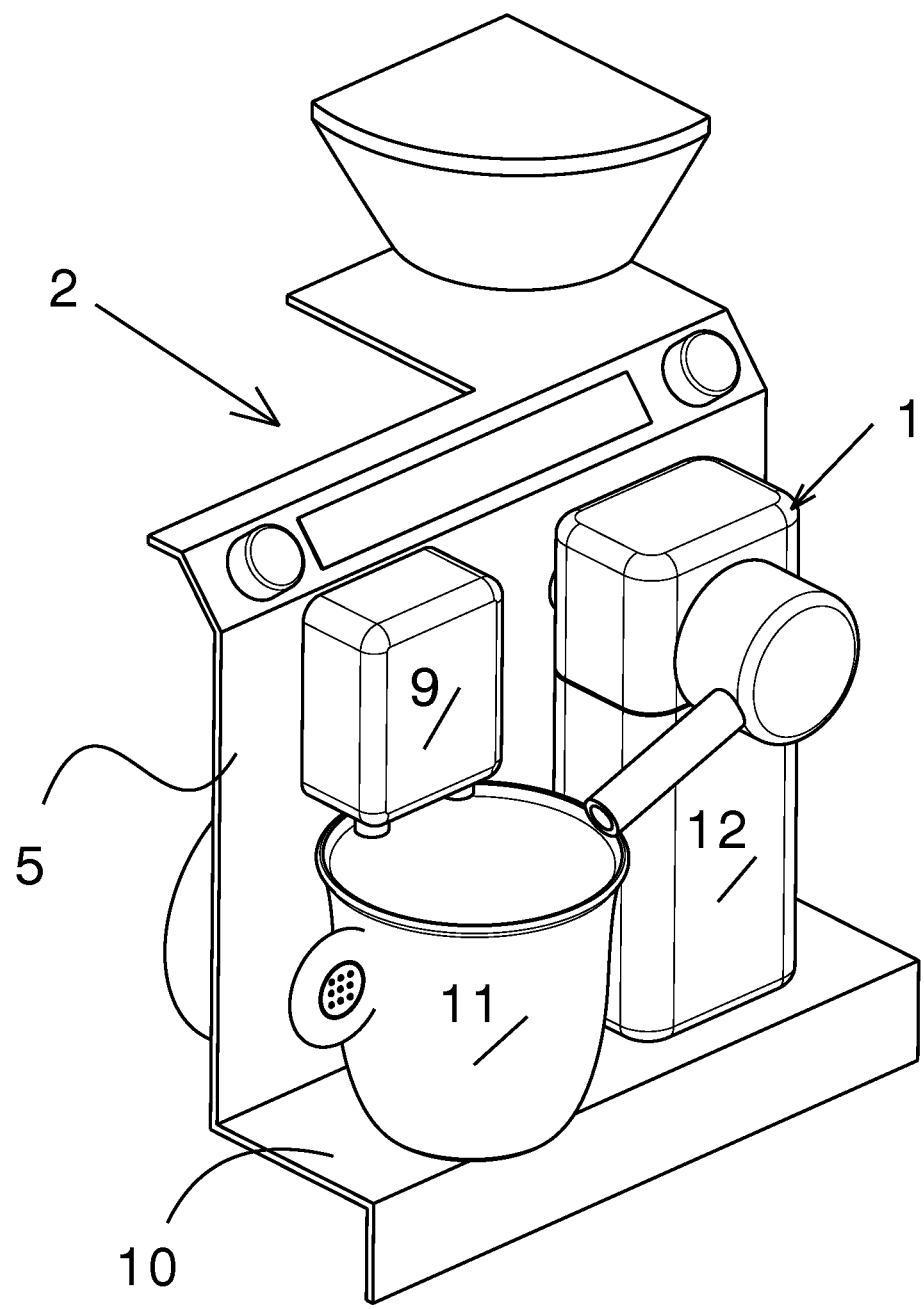
FIG. 2 is a perspective view from outside of the front part of the coffee machine to which the emulsifying device is connected, in which the external dispensing channel is directed into the cup.
Figure 3:
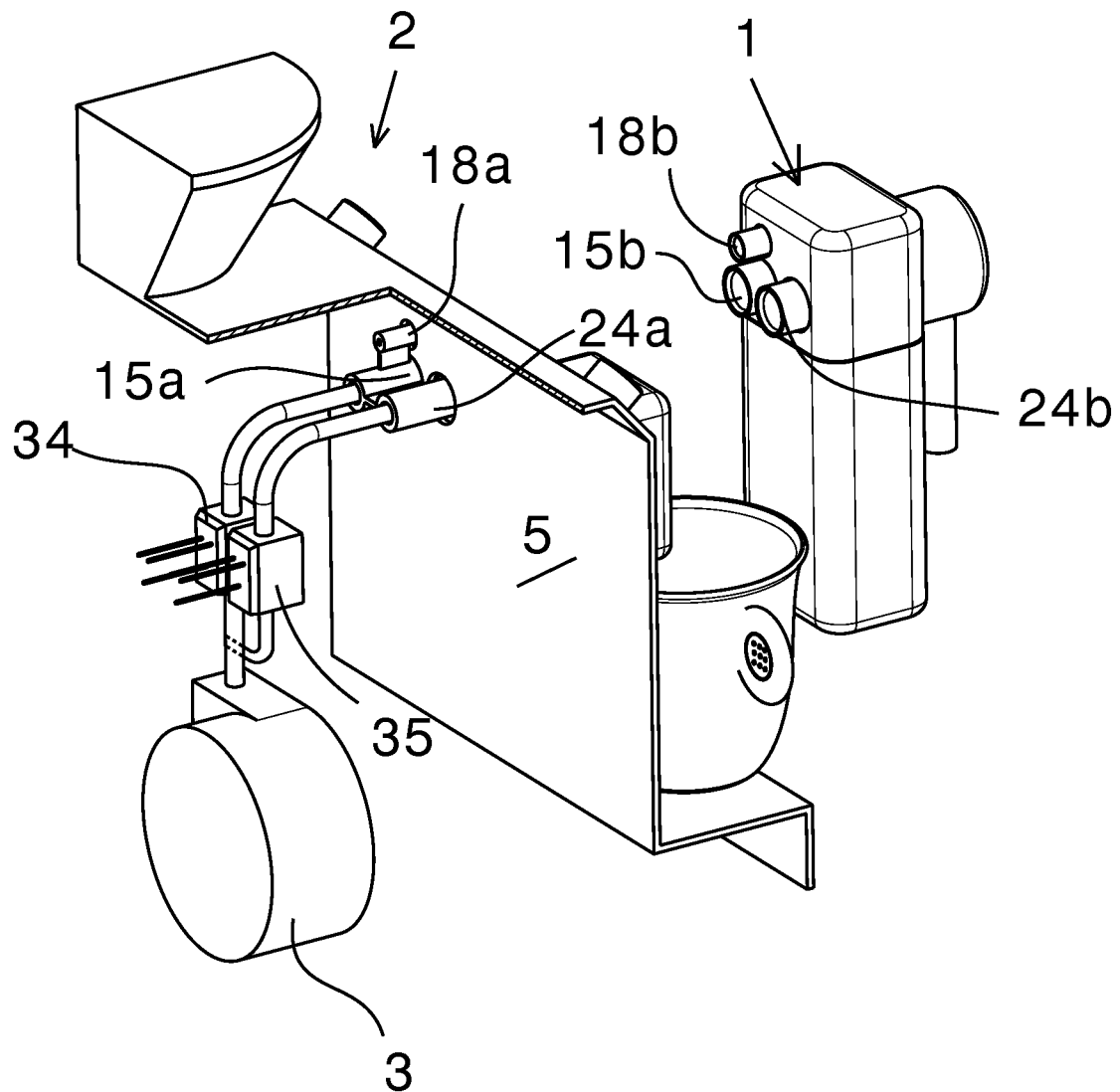
FIG. 3 is a perspective view from inside of the front part of the coffee machine with the emulsifying device disconnected.
Figure 4:
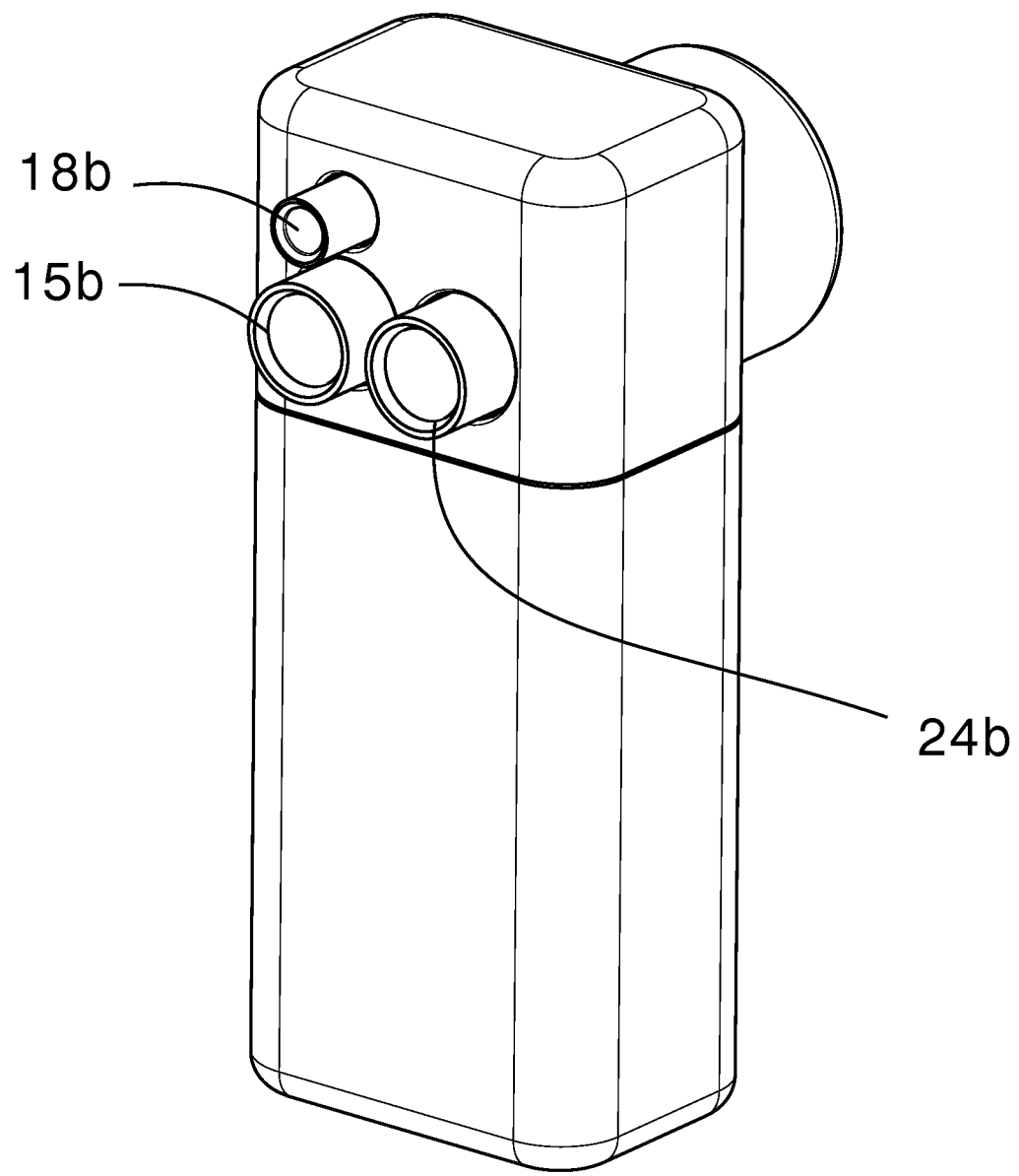
FIG. 4 is a rear perspective view of the emulsifying device.
Figure 5:
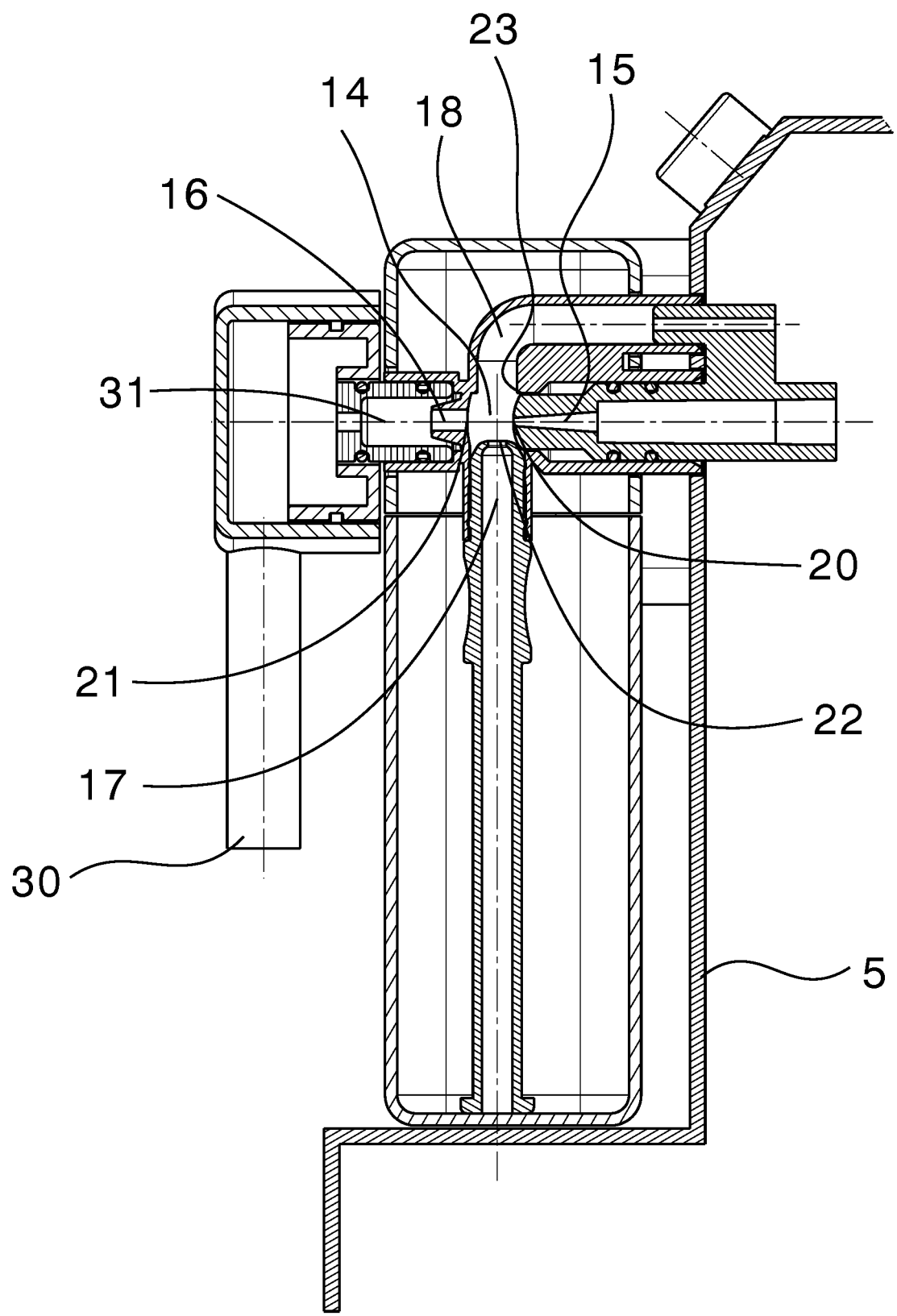
FIG. 5 is a side elevation of the emulsifying device sectioned along a vertical plane at the mixing chamber used for the production of hot milk with froth.
Figure 6:
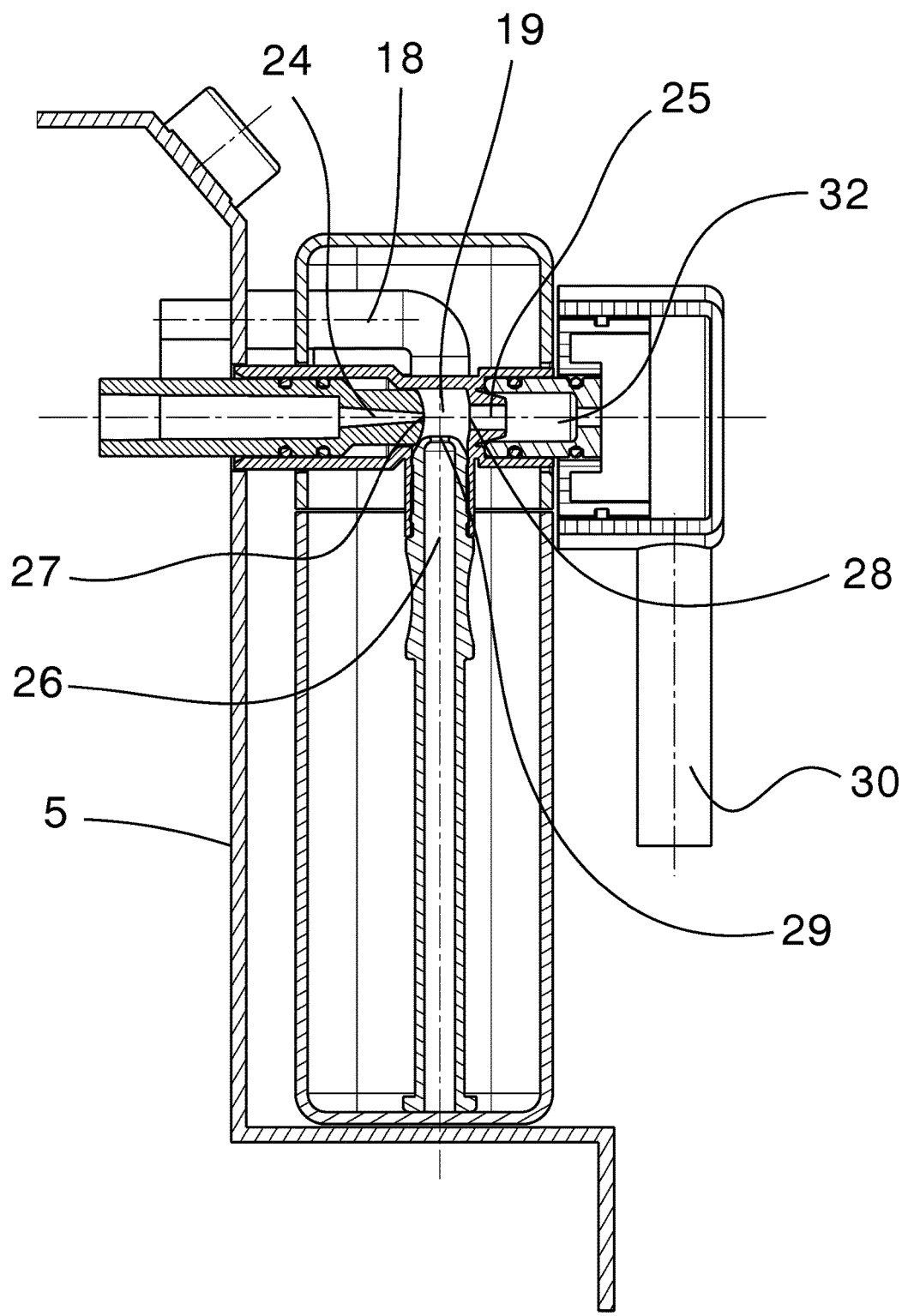
FIG. 6 is a side elevation of the emulsifying device sectioned along a vertical plane at the mixing chamber used for the production of hot milk without froth.
Figure 7:
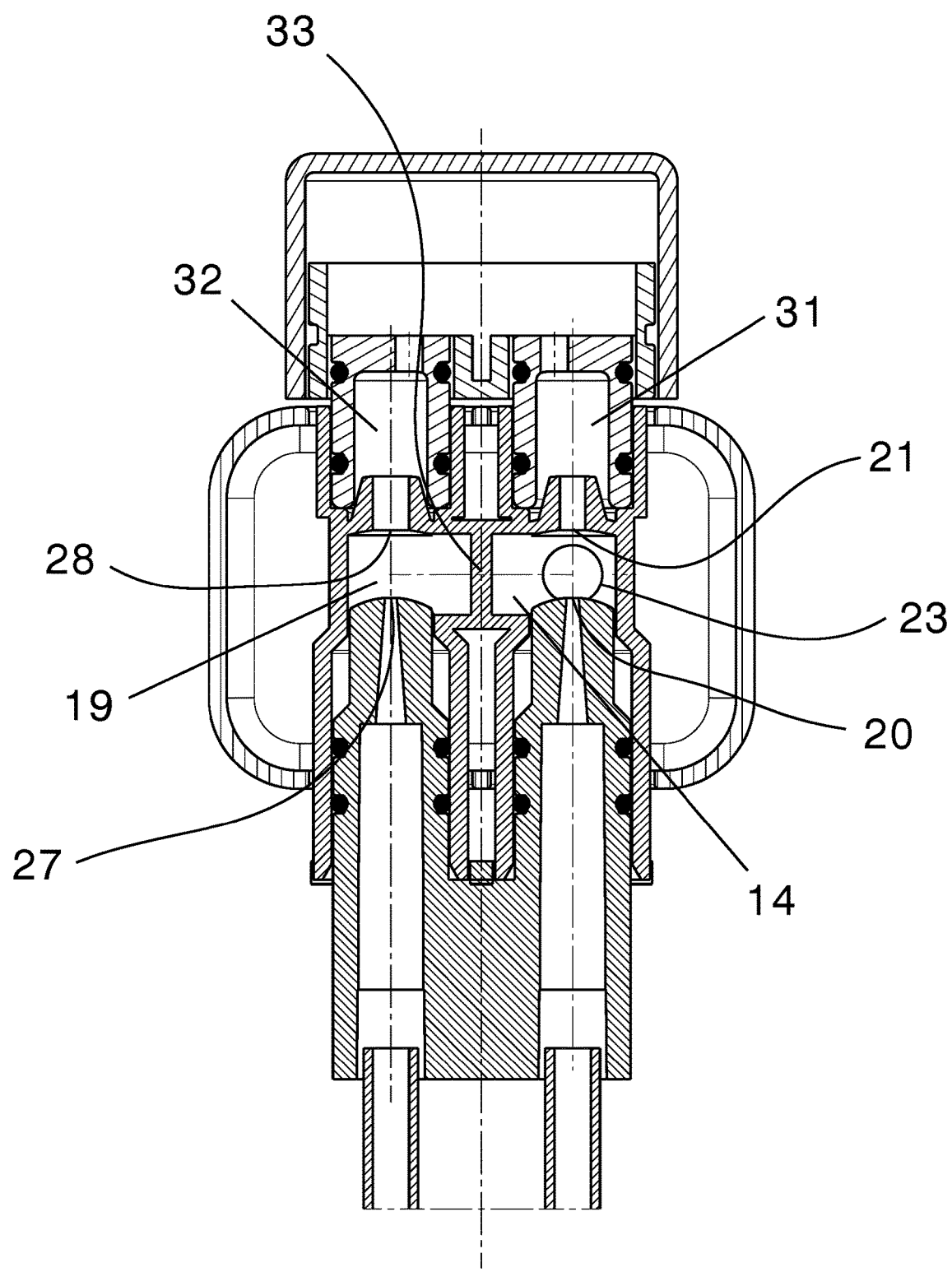
FIG. 7 is a plan view from below of the emulsifying device sectioned along a horizontal plane.
Figure 8:
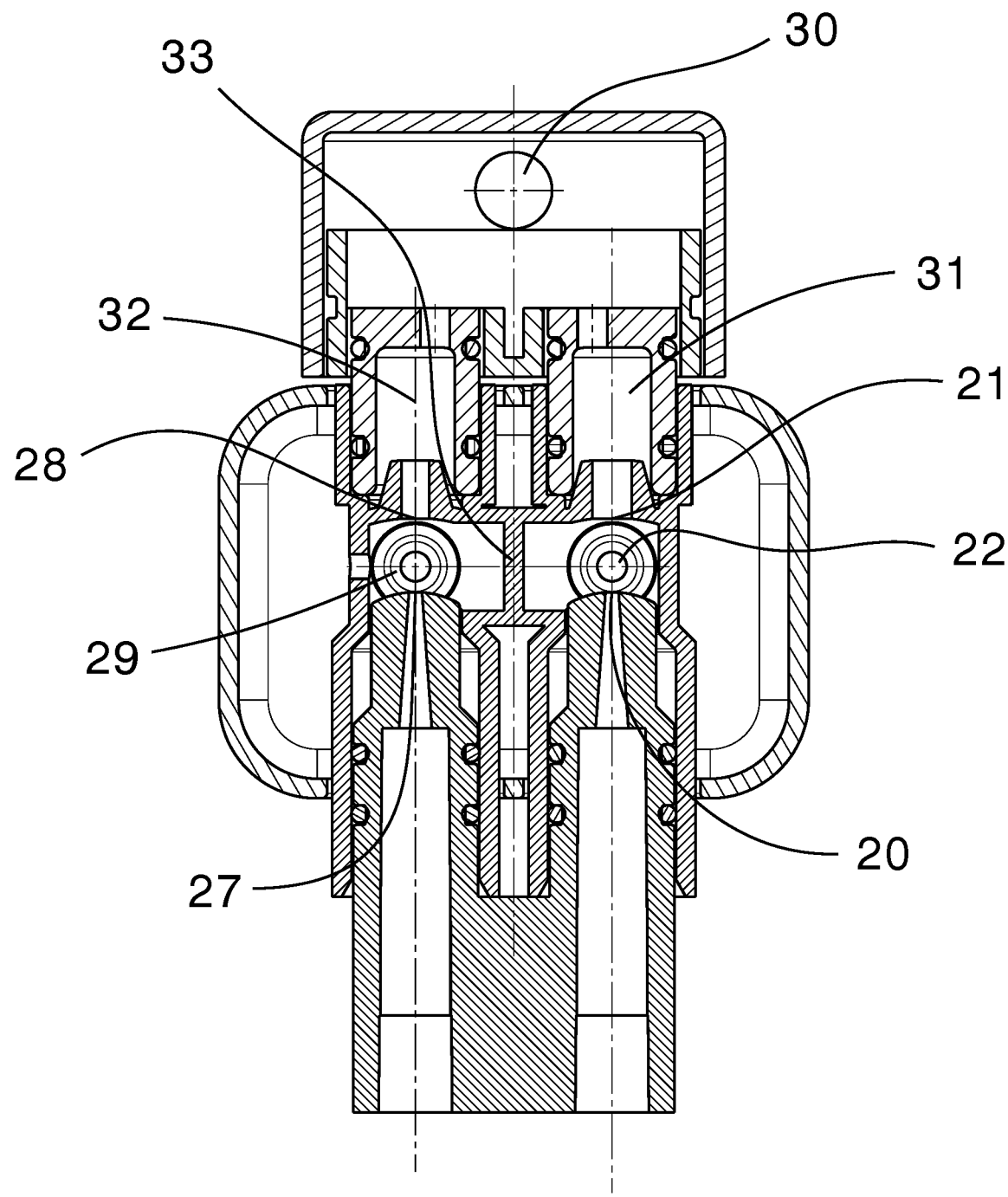
FIG. 8 is a plan view from below of the emulsifying device sectioned along a horizontal plane.
Figure 9:
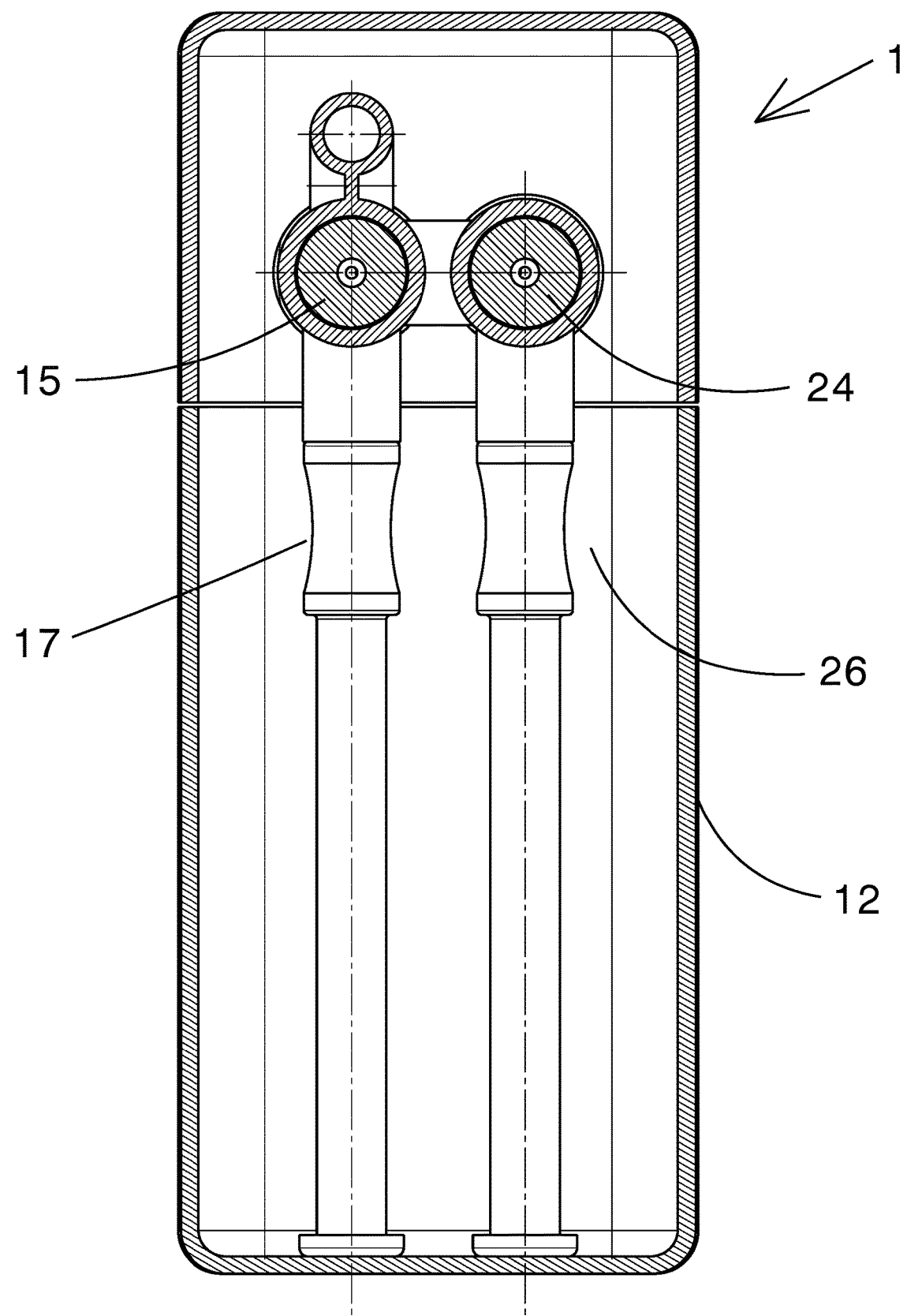
FIG. 9 is a rear view of the emulsifying device sectioned along a vertical plane at the steam inflow channels.

Initially with reference to figures from 1 to 9, an emulsifying device 1 of milk is illustrated, connectable to a steam generator 3 included in the coffee machine 2.

The emulsifying device 1 comprises a milk container 12 and a hollow body 13 removably engaged to the milk container 12.

As well as the milk emulsifying function, the hollow body 13 also functions as a closing cover of the milk container 12 and is therefore applied at the open top of the milk container 12.

The hollow body 13 comprises a first mixing chamber 14 with a Venturi effect for production of hot milk with froth and a second mixing chamber 19 with a Venturi effect for production of hot milk without froth.

The first mixing chamber 14 is connected to a first steam inflow channel 15, to a first milk outflow channel 16, to a first milk aspirating channel 17 by Venturi effect positioned in the milk container 12 and to a milk aspirating channel 18 by Venturi effect in communication with the external environment.

The first mixing chamber 14 is delimited by the end wall of the first steam inflow channel 15 which comprises the outlet section 20 of the first steam inflow channel 15, by the end wall of the first milk outflow channel 16 which comprises the inlet section 21 of the first milk outflow channel 16, by the end wall of the first milk aspirating channel 17 by Venturi effect which comprises the outlet section 22 of the first milk aspirating channel 17, and by the end wall of the air aspirating channel 18 by Venturi effect which comprises the outlet section 23 of the air aspirating channel 18.

In the present invention, when reference is made to the section of a channel, this is understood to relate to the internal section.

The first steam inflow channel 15 and the first milk outflow channel 16 extend along a horizontal axis, and the first milk aspirating channel 17 extends with a vertical axis and joins from the bottom with the first mixing chamber 14, while the air aspirating channel 18 has a horizontally-extending portion comprising the inlet section and a vertically-extending portion comprising the outlet section 23 which joins to the first mixing chamber 14 from above.

The second mixing chamber 19 is connected to a second steam inflow channel 24, to a second milk outflow channel 25, and to a second milk aspirating channel 26 by Venturi effect positioned in the milk container 12.

The second mixing chamber 19 is delimited by the end wall of the second steam inflow channel 24 which comprises the outlet section 27 of the second steam inflow channel 24, by the end wall of the second milk outflow channel 25 which comprises the inlet section 28 of the second milk outflow channel 25, and by the end wall of the second milk aspirating channel 26 by Venturi effect which comprises the outlet section 29 of the second milk aspirating channel 26.

As there is no requirement to create hot milk with froth, unlike the first mixing chamber 14, the second mixing chamber 19 is not provided with an air aspirating channel.

The second steam inflow channel 24 and the second milk outflow channel 25 extend along a horizontal axis, the second milk aspirating channel 26 extends with a vertical axis and joins from the bottom with the second mixing chamber 19.

The air aspirating channel 18, the first steam inflow channel 15 and the second steam inflow channel 24 as illustrated each have a first component 18a, 15a, 24a supported in a fixed way by the coffee machine 2 and sealedly removably engaged in a corresponding second component 18b, 15b, 24b fashioned in the hollow body 13.

In this way it is possible to remove the milk container 12 and the hollow body 13 acting as a cover from the coffee machine 2 in order to place them in a refrigerator, to wash them, to fill or empty the container or perform maintenance thereon.

The first component 18a, 15a, 24a supported by the coffee machine 2 in order to be able to connect to the corresponding second component 18b, 15b, 24b supported by the hollow body 13 extends externally of the front wall 5 of the casing of the coffee machine 2, where there are also a control panel 8, a coffee dispenser 9 and a rest surface 10 for the cups 11.

The first and the second mixing chamber 14, 19 have the same conformation and the same volume and have the outlet sections 20, 27 of the steam inflow channel 15, 24, the outlet section 22, 29 of the milk inflow channel 17, 26 and the inlet section 21, 28 of the milk outflow channel 16, 25 arranged symmetrically with respect to a vertical halfway plane 33 of the hollow body 13. The first steam inflow channel 15 is coaxial to said first milk outflow channel 16 and likewise the second steam inflow channel 24 is coaxial to the second milk outflow channel 25.

The first and the second steam inflow channel 15, 24 have outlet sections 20, 27 having a same dimension and in particular the section thereof is progressively reduced in the terminal portion comprising the outlet section 20, 27 so as to accelerate the steam flow and create a depression internally of the first and second mixing chamber 14, 16 which determines the aspiration by Venturi effect of milk and air.

The first and the second milk aspirating channel 17, 26 also have a same outlet section 22, 29.

In particular both the section of the steam inflow channels 15, 24 and the section of the milk inflow channels 17, 26 are identical in the axial direction.

For the reasons which will be described, the first and the second milk outflow channel 16, 25 advantageously have different sections.

The first milk outflow channel 16 and the second milk outflow channel 25 more precisely have differently-dimensions section having a constant progression in an axial direction.

In particular the section of the second milk outflow channel 25 has a greater dimension than the section of the first milk outflow channel 16.

The hollow body 13 further comprises a single external milk dispensing channel 30 connected both to the first milk outflow channel 16 and to the second milk outflow channel 25.

The external milk dispensing channel 30 is hinged to the rest of the hollow body 13 so as to rotate between an operating position in which it is orientated with an inclination for direct dispensing into the cup 11 and a rest position in which it is orientated for vertical dispensing in a downwards direction.

A first post-mixing chamber 31 is interposed between the first milk outflow channel 16 and the external dispensing channel 30 of the milk, and likewise a second post-mixing chamber 32 is interposed between the second milk outflow channel 25 and the external dispensing channel 30 of the milk.

The outlet pathway of the first post-mixing chamber 31 is offset with respect to the inlet pathway and likewise the outlet pathway of the second post-mixing channel 32 is offset with respect to the inlet pathway.

The emulsifying device 1 advantageously has a first dispensing operating configuration of hot milk with froth in which the first mixing chamber 14 is selectively active and a second operating dispensing configuration of hot milk without froth in which the second mixing chamber 19 is selectively active, and reconfigurating means activatable for switching between the first and the second configuration.

The reconfigurating means are formed by intercepting valve means which selectively distribute the steam flow to the first steam inflow channel 15 or to the second steam inflow channel 24.

The valve means preferably comprise a first valve 34 installed on the first component 15a of the first steam inflow channel 15 and a second valve 24a installed on the first component 24a of the second inflow channel 24.

In substance, the valves 34, 35 are piloted by the electronic controller of the coffee machine 2 so that the if user selects a production cycle of hot milk with froth, the valve 34 opens and the valve 35 closes so that the first mixing chamber 14 is operative, while if the user selects a production cycle of hot milk without froth the valve 35 opens and the valve 34 closes so that the second mixing chamber 19 is operative.

A dispensing cycle of hot milk with froth and a dispensing cycle of hot milk without froth carried out with a same steam flow with a same duration give a result, in the cup, of a product having substantially the same temperature.

In fact in the dispensing cycle of hot milk with froth, the entity of the depression useful for the aspirating of the milk into the first mixing chamber 14 is limited by the presence of an aspirated air flow in the first mixing chamber. In the dispensing cycle of hot milk without froth, in order to have substantially the same entity of the depression useful for the aspiration of the milk into the second mixing chamber 19, the dimension of the milk outflow channel 25 is deliberately increased. As, in the first mixing chamber in operation during the production cycle of hot milk with froth and in the second mixing chamber in operation during the production cycle of hot milk without froth, a depression substantially of the same entity is established, the flow of aspirated milk is substantially the same, and consequently the proportion with which the aspirated milk flow mixes with the steam flow is substantially the same, with the result that the final product in the cup has substantially the same temperature.

Figure 10:
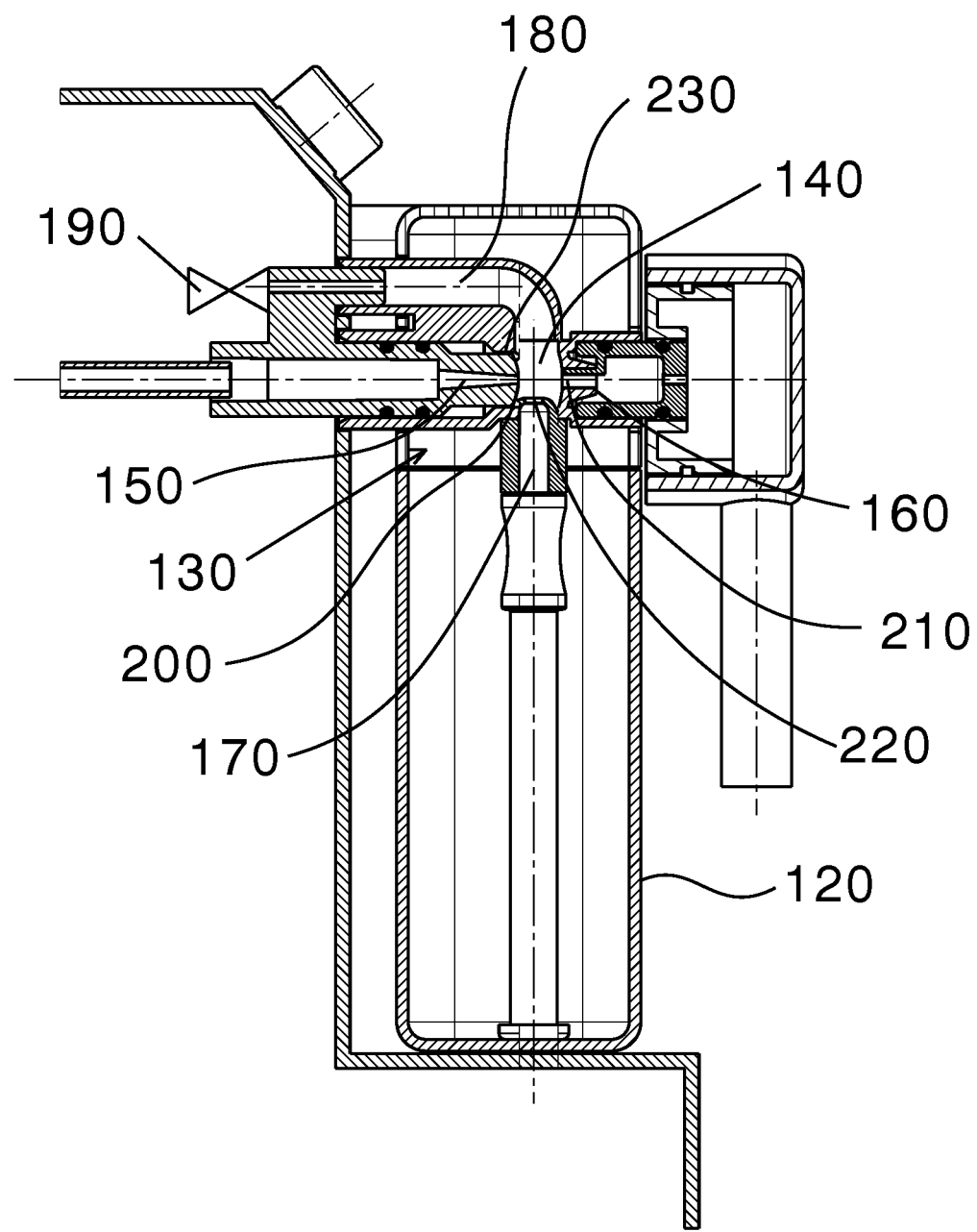
FIG. 10 is a side elevation of an emulsifying device relating to a second embodiment of the invention, sectioned along a vertical plane at the mixing chamber, in the configuration used for the production of hot milk with froth.
Figure 11:
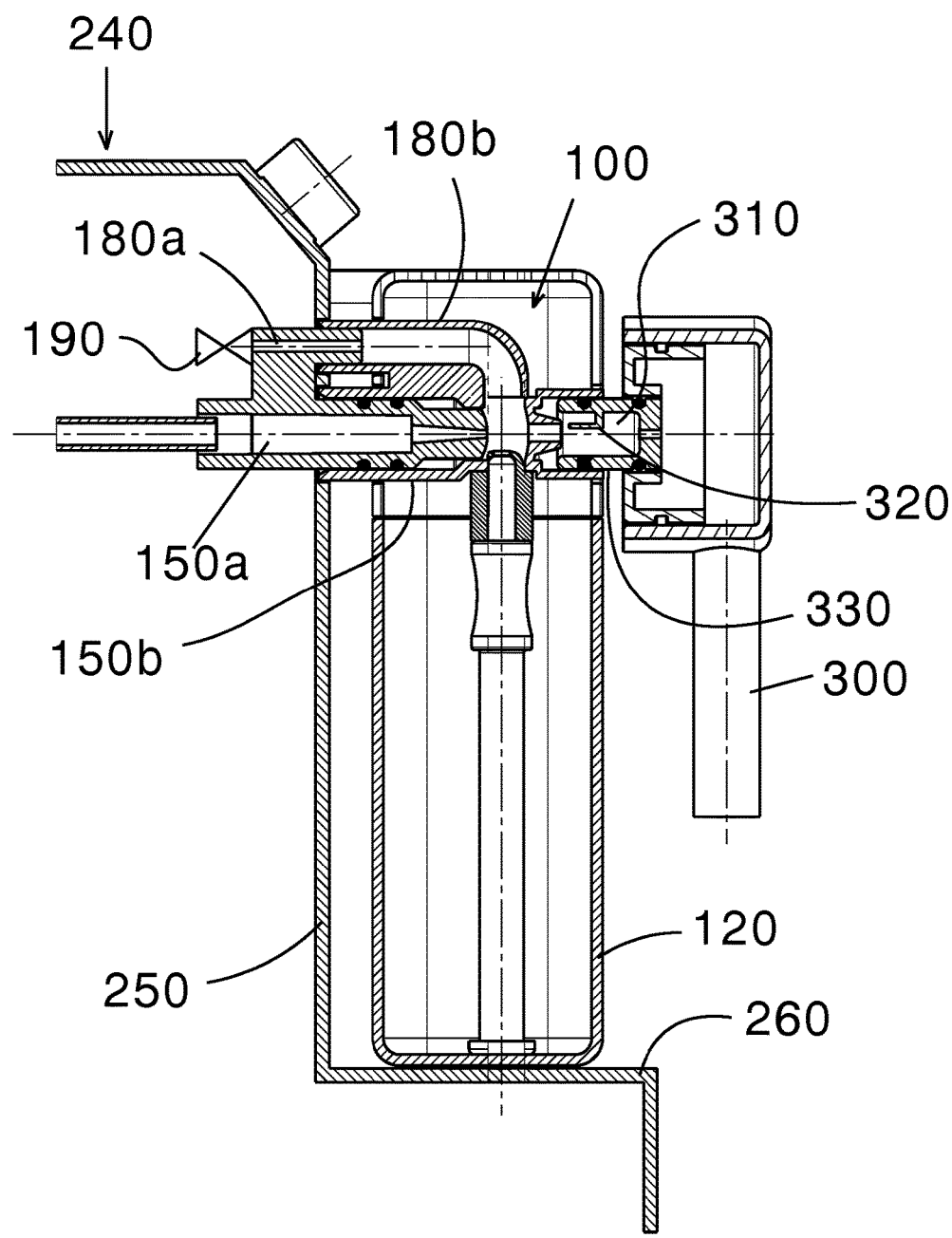
FIG. 11 is a side elevation of the emulsifying device of claim 10, sectioned along a vertical plane at the mixing chamber, in the configuration used for the production of hot milk without froth.

We now make reference first to the second embodiment of the emulsifying device illustrated in FIGS. 10 and 11.

The hollow body 130 comprises a single mixing chamber 140 with a Venturi effect both for production of hot milk with froth and for production of hot milk without froth.

The mixing chamber 140 is connected to a steam inflow channel 150, to a milk outflow channel 160, to a milk aspirating channel 170 by Venturi effect positioned in the milk container 120 and to an air aspirating channel 180 provided with a check valve 190 by Venturi effect in communication with the external environment.

The mixing chamber 140 is delimited by the end wall of the steam inflow channel 150 which comprises the outlet section 200 of the first steam inflow channel 150, by the end wall of the milk outflow channel 160 which comprises the inlet section 210 of the first milk outflow channel 160, by the end wall of the milk aspirating channel 170 by Venturi effect which comprises the outlet section 220 of the milk aspirating channel 170 by Venturi effect, and by the end wall of the air aspirating channel 180 by Venturi effect which comprises the outlet section 230 of the air aspirating channel 180 by Venturi effect.

The steam inflow channel 150 and the milk outflow channel 160 extend along a horizontal axis, the milk aspirating channel 170 extends with a vertical axis and joins from the bottom with the mixing chamber 140, while the air aspirating channel 180 has a horizontally-extending portion comprising the inlet section and a vertically-extending portion comprising the outlet section which joins to the first mixing chamber 140 from above.

The air aspirating channel 180 and the steam inflow channel 150 as illustrated each have a first component 180a, 150a, supported in a fixed way by the coffee machine 240 and sealedly engaged in a corresponding second component 180b, 150b fashioned in the hollow body 130.

In this way it is possible to remove the milk container 120 and the hollow body 130 acting as a cover from the coffee machine 240 in order to place them in a refrigerator, to wash them, to fill or empty the container or perform maintenance thereon.

The first component 180a, 150a, supported by the coffee machine 240 in order to be able to connect to the corresponding second component 180b, 150b supported by the hollow body 130, extends externally of the front wall 250 of the casing of the coffee machine 240, where there are also a control panel, a coffee dispenser and a rest surface 260 for the cups.

The single steam inflow channel 150 is coaxial to said single milk outflow channel 160.

The steam inflow channel 150 has a section which progressively diminishes in the terminal portion comprising the outlet section 200 so as to accelerate the steam flow and create a depression internally of the mixing chamber 140 which determines the aspiration by Venturi effect of milk and air.

The hollow body 130 further comprises an external dispensing channel 300 of milk.

A post-mixing chamber 310 is interposed between the milk outflow channel 160 and the external dispensing channel 300 of the milk.

The outlet pathway of the first post-mixing chamber 310 is offset with respect to the inlet pathway.

The emulsifying device 100 advantageously has a first dispensing operating configuration of hot milk with froth in which the check valve 190 is open and the milk outflow section has a certain dimension and a second operating dispensing configuration of hot milk without froth in which the check valve is closed and the milk outflow section has a greater dimension with respect to the first configuration, and reconfigurating means activatable for switching between the first and the second configuration.

The reconfigurating means in the embodiment of FIG. 10, 11 are formed by a partialising member 320 of the section of the milk outflow channel 160.

The partialising member 320 is translatable according to the axis of the milk outflow channel 160 between an engaged position and a disengaged position therefrom.

The partialising member 320 is fashioned on the same part 330 that forms the post-mixing chamber 310.

This part 330 has a cylindrical conformation and acts as a support pin in rotation of the external dispensing channel 300.

The selection of the configuration can be carried out manually by a traction action or a thrust action on the external dispensing channel 330 which is solid in translation with the partialising member 320.

A dispensing cycle of hot milk with froth and a dispensing cycle of hot milk without froth carried out with a same steam flow rate and duration give a result, in the cup, of a product having substantially the same temperature.

In fact in the dispensing cycle of hot milk with froth, the entity of the depression useful for the aspirating of the milk into the mixing chamber is limited by the presence of an aspirated air flow in the first mixing chamber. In the dispensing cycle of hot milk without froth, in order to have substantially the same entity of the depression useful for the aspirating of the milk into the mixing chamber in the absence of the aspirated air flow, the dimension of the milk outflow channel is deliberately increased. As a substantially same-entity depression is created in the mixing chamber, the flow of aspirated milk is substantially the same in the two dispensing cycles and consequently the proportion with the aspirated milk flow mixes with the steam flow is substantially the same, with the result that the final product in the cup has substantially the same temperature.

The emulsifying device as conceived herein is susceptible of numerous modifications and variants, all falling within the scope of the inventive concept; furthermore, all the details are replaceable by technically equivalent elements.

Lastly, the materials used, as well as the dimensions, can be any according to the needs and the state of the art.

The invention claimed is:

1. A milk emulsifying device (100) comprising a hollow body (130) exhibiting:
 a single mixing chamber (140) operating by Venturi effect, connected to a single steam inflow channel (150), to a single milk aspirating channel (170) by Venturi effect, to a single air aspirating channel (180) by Venturi effect provided with a check valve (190), and to a single milk outflow channel (160); and
 a single external milk dispensing channel (300) connected to said single outflow channel (160);
 said milk emulsifying device (100) having a first dispensing operating configuration of hot milk with a froth and a second operating dispensing configuration of hot milk without a froth, which differ in a size of the single milk outflow channel (160), and a reconfigurating mechanism (320) activatable for switching said milk emulsifying device (100) between said first and said second dispensing operating configurations;
 wherein the reconfigurating mechanism (320) comprises a partializing member of an outflow section of said single milk outflow channel (160).

2. The milk emulsifying device (100) according to claim 1, wherein said single external milk dispensing channel (300) is orientable.

3. The milk emulsifying device (100) according to claim 1, wherein said single steam inflow channel (150) is coaxial to said single milk outflow channel (160).

4. The milk emulsifying device (100) according to claim 1, further comprising a post-mixing chamber (310) interposed between said single milk outflow channel (160) and said single external milk dispensing channel (300), where the partializing member is located within the post-mixing chamber (310) and the post-mixing chamber (310) is translatable according to an axis of the single milk outflow channel 160 between said first and said second dispensing operating configurations.

5. The milk emulsifying device (100) according to claim 1, wherein a larger-area milk outflow section of said single milk outflow channel (160) corresponds to the first dispensing operating configuration and a smaller-area milk outflow section of said single milk outflow channel (160) corresponds to the second dispensing operating configuration, wherein the larger-area or smaller-area milk outflow section is determined by a location of the partializing member.

6. A coffee machine (240) connected to the milk emulsifying device (100) according to claim 1.

7. A production method of hot milk with or without froth, using the Venturi effect emulsifying device (100) according to claim 1, where the emulsifying device (100) is configured for sending, into a mixing chamber, a flow of steam so as to aspirate, by Venturi effect, milk and air or only milk, wherein a production cycle of hot milk with froth and a production cycle of hot milk without froth are carried out by supplying an equal flow of steam of equal duration into a mixing chamber having equal volume, equal conformation and equal inlet section of the milk but a different outflow section of the milk.

8. The milk emulsifying device (100) according to claim 1, wherein said partializing member is translatable according to an axis of the single milk outflow channel 160 between said first and said second dispensing operating configurations, wherein, in the first dispensing operating configuration, the partializing member is located within said outflow section of said single milk outflow channel (160), and in the second dispensing operating configuration, the partializing member is located outside said outflow section of said single milk outflow channel (160).

9. The milk emulsifying device (100) according to claim 4, where, in the first dispensing operating configuration, the partializing member is located within said outflow section of said single milk outflow channel (160), and in the second dispensing operating configuration, the partializing member is located outside said outflow section of said single milk outflow channel (160).

10. A milk emulsifying device (1) comprising a hollow body (13) exhibiting:
 a first mixing chamber (14) operating by Venturi effect, the first mixing chamber (14) being connected to:
 a first steam inflow channel (15);

a first milk outflow channel (16);

a first milk aspirating channel (17) by Venturi effect; and an air aspirating channel (18) by Venturi effect;

a second mixing chamber (19) operating by Venturi effect, the second mixing chamber (19) being connected to:

a second steam inflow channel (24);

a second milk outflow channel (25);

a second milk aspirating channel (26) by Venturi effect; and a single external milk dispensing channel (30) connected to said first milk outflow channel (16) and to said second outflow channel (25);

said emulsifying device (1) having a first dispensing operating configuration of hot milk with a froth and a second dispensing operating configuration of hot milk without a froth, wherein the emulsifying device (1) includes a reconfigurating mechanism (34, 35) configured and activatable to switch said emulsifying device (1) between said first and said second dispensing operating configurations.

11. The milk emulsifying device (1) according to claim 10, wherein said reconfigurating mechanism (34, 35) includes valves configured to supply a steam flow selectively to said first and to said second steam inflow channels (15, 24).

12. The milk emulsifying device (1) according to claim 11, wherein said first and said second steam inflow channels (15, 24) each have an outlet section (20, 27) of similar dimension.

13. The milk emulsifying device (1) according to claim 11, wherein said first and said second milk outflow channels (16, 25) each have an inlet section (21, 28) of differing dimension.

14. The milk emulsifying device (1) according to claim 11, wherein said first and said second milk aspirating channels (17, 26) each have an outlet section (22, 29) of similar dimension.

15. The milk emulsifying device (1) according to claim 11, wherein said first steam inflow channel (15) is coaxial to said first milk outflow channel (16) and said second steam inflow channel (24) is coaxial to said second milk outflow channel (25).

16. The milk emulsifying device (1) according to claim 11, wherein said first and said second mixing chamber (14, 19) have a same conformation and volume.

17. The milk emulsifying device (1) according to claim 11, further comprising a first post-mixing chamber (31) interposed between said first milk outflow channel (16) and said single external milk dispensing channel (30), and a second post-mixing channel (32) interposed between said second milk outflow channel (25) and said single external milk dispensing channel (30).

18. A coffee machine (2) connected to the milk emulsifying device (1) according to claim 10.

19. The milk emulsifying device (1) according to claim 10, wherein said single external milk dispensing channel (30) is orientable.

\* \* \* \* \*